United States Patent [19]

DiBona, Jr.

[11] 4,160,604

[45] Jul. 10, 1979

[54] TUNA AND EGG-SALAD MIXER

[76] Inventor: Anthony DiBona, Jr., 74-16 220th St., New York, N.Y. 11364

[21] Appl. No.: 903,198

[22] Filed: May 5, 1978

[51] Int. Cl.² .............................................. B01F 7/20
[52] U.S. Cl. ..................................... 366/247; 366/307
[58] Field of Search ............... 366/245, 247, 253, 303, 366/307, 302, 304

[56] References Cited

U.S. PATENT DOCUMENTS

| | | | |
|---|---|---|---|
| 197,674 | 11/1877 | Shipe | 366/247 |
| 754,931 | 3/1904 | Meyrick | 366/307 |
| 814,548 | 3/1906 | Kridelbaugh | 366/307 |
| 946,610 | 1/1910 | Malmquist | 366/303 |
| 1,191,170 | 7/1916 | Free | 366/247 |
| 1,235,378 | 7/1917 | Poltschbach | 366/247 |
| 1,475,081 | 11/1923 | Parks | 366/248 |
| 1,510,081 | 9/1924 | Ruland | 366/303 |

Primary Examiner—Robert W. Jenkins

[57] ABSTRACT

In a preferred embodiment, a cylindrical vessel and top thereof encloses salad-mixing space having a rotatable extending downwardly through the top/lid with a cranking handle located on an upper end of the rotatable shaft and rod-like elements extending outwardly from a lower portion of the shaft below the lid and positioned to intermesh and move past other rod-like elements extending inwardly into central space of the salad-mixing space.

8 Claims, 2 Drawing Figures

TUNA AND EGG-SALAD MIXER

This invention relates to a novel salad mixing unit for quickly and effectively mixing and breaking-up salad components.

BACKGROUND TO THE INVENTION

Time-saving yet inexpensive devices are the items demanded by house-wives as well as restaurants today. The mixing of salads, together with the dicing of the components thereof is a very demanding and time-consuming task, and yet necessary in order to obtain optimal result in the preparation of an aesthetically pleasing appearance and taste of the salad when completed. Heretofore there has not been any suitable device for achieving optimal results quickly, nor by any simple and inexpensive device.

SUMMARY OF THE INVENTION

Objects of the present invention include the overcoming of problems and difficulties of the types discussed above.

In particular, an object is to obtain a salad mixing unit effective to mix and dice salad components with a few turns of a handle.

Another object is to obtain maximum mixing of a salad in a minimal number of turns of a crank handle for mixing.

Another object is to obtain a salad mixing device of simple construction and mechanism having maximal effectiveness in both mixing and dicing salad components.

Another object is to obtain a salad mixing device of a conveniently small size and of low cost of construction, as to make the purchase price thereof economically reasonable and suitable for home use by the house-wife.

Other objects become apparent from the preceding and following disclosure.

One or more objects of the present invention are obtained by the present invention as disclosed above and hereinafter, as typically represented by the illustrative Figures which are not intended to limit the scope of the invention unduly, but to merely illustrate and facilitate an understanding of the features of the invention.

Broadly the invention may be described as an open-top vessel provided with rods extending from the inner side walls inwardly into inner space of a preferably cylindrical vessel, with the rods being preferably off-set from adjacent other rods such that no two consecutive ones thereof are one over the other or one directly under the other; in conjunction therewith, a top lid preferably of the wedge type or snap-over type, has a mixing device mounted thereon, with a rod extending therethrough carrying a cranking handle at an upper end of the rod above the lid, and carrying below the lid on the thus-lower portion of the shaft, a plurality of outwardly-extending rods, arranged preferably such that no two adjacent ones thereof are one over or under directly the other, and positioned such that the shaft-rods are intermeshable with and movable past the vessel-rods when the cranking handle is turned. The vessel-rods are at different levels, and the shaft rods are at different levels from one-another and from the vessel rods.

By the present invention, upon placing salad material into the vessel space, to be mixed, and upon placing the lid upon the open-top vessel, and thereupon a few turns, typical three or four turns, normally effectively mixes and dices the entire contents.

In addition to achieving the intended function, there is no problem of jamming because in a preferred embodiment, the vessel rods are off-set as well as the shaft-rods being off-set, thus allowing the ingredients at the different levels to tumble over and not to jam, and to move into the path of the next, oncoming moving shaft-rod.

The invention may be better understood by making reference to the following Figures.

THE FIGURES

DETAILED DESCRIPTION

Figure 1:
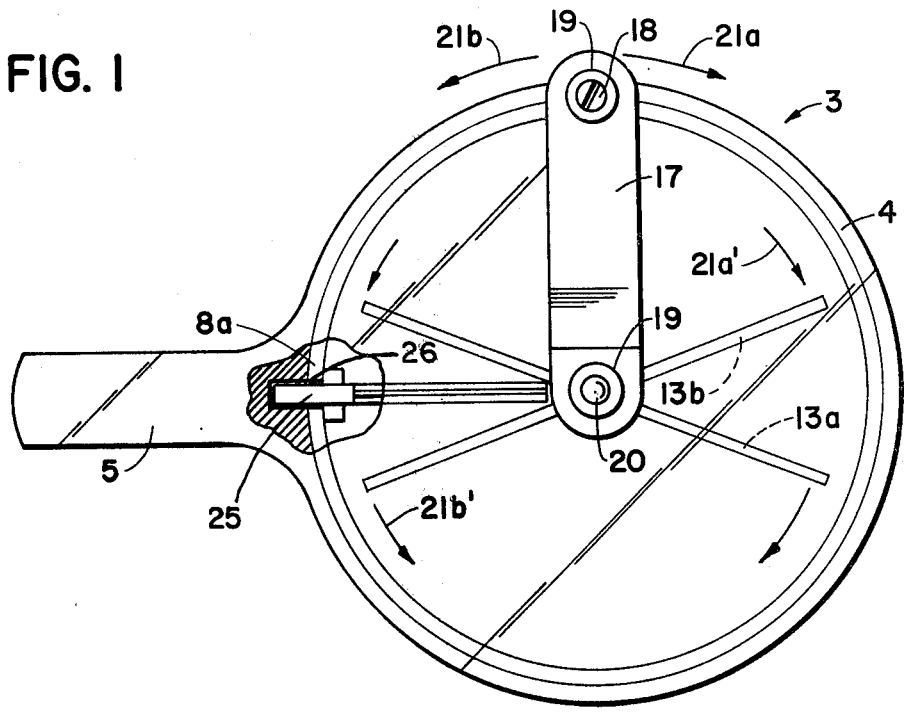
FIG. 1 illustrates an elevation plan view with partial cut-away, of the novel salad mixing unit of this invention.
Figure 2:
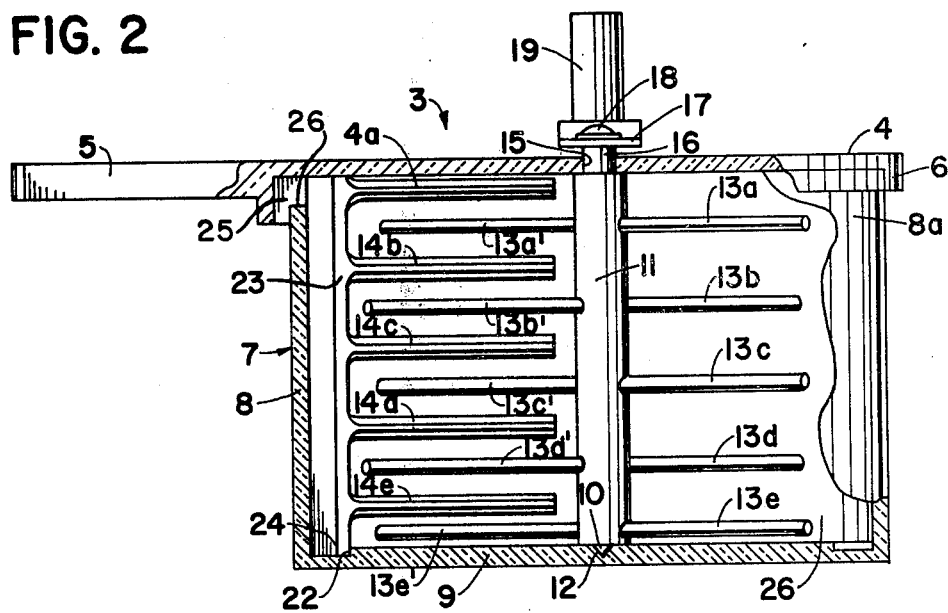
FIG. 2 illustrates a side cross-sectional view of the embodiment of FIG. 1.

In greater detail, FIGS. 1 and 2 disclose the same illustrative embodiment, and accordingly the indicia are the same for commonly-illustrated parts.

Broadly the salad mixing unit 3 is illustrated in both Figures, as well as the lid 4 with its handle 5 for stabilizing the unit when cranking the handle lever 17 by the revolvable knob 19 revolvably mounted around pin 18 on lever 17, which lever 17 when revolved causes the revolvable structure 11 revolve as driven by interconnecting pin 20. The lid 4 and handle 5 are anchored into the vessel 7 by key 25 within cut-out slot 26 in downwardly-extending lid flange 6 preventing lateral rotating shifting of the lid when mounted on the vessel 7, the key 25 being an extension of the male tooth-carrying vessel structure 23 having horizontally-projecting teeth 14a through 14e, seated as its base 24 within groove 22 of vessel bottom 9. The vessel bottom 9 has the V-cut-out 12 which seats the v-point 10 of the revolvable structure 11 which has to spaced-apart and staggered revolvable teeth 13a and 13a' through 13e and 13e', each tooth being a shaft extending through the revolvable structure 11 and thereby revolvable therewith as handle lever 17 is cranked manually (or by a motor if desired). However, this invention has part of the novelty and utility thereof in the simplicity and effectiveness devoid of motors and the like.

The key 25 has extension 25a which locks the tooth-carrying structure securably onto the upper side portion 8a. The lid has flange 6 overhanging and fastening around the vessel 7 wall 8 also at the upper wall portion 8a. Washer 18 together with screw 20 lock lever 17 onto the revolvable structure 11.

Accordingly, by removing the lid, the revolvable structure 11 is also lifted-out of the vessel space, upon which time the salad matter to be mixed and/or diced, is placed into the space and the lid is again replaced and snapped-onto the vessel wall.

While the vessel and lid may vary in shape, the preferred shape as illustrated, is a round (cylindrical) vessel with round lid, thereby preventing matter from becoming lodged within corners that would exist with other shapes.

It is contemplated that the vessel be transparent and of clear plastic in order that the contents may at all times be viewed, but the vessel and lid or either and both, instead of being transparent, may be translucent or opaque as might be desired, and of any desired color.

While the invention has been illustrated as preferred, it is within the scope of the invention to employ equivalents in structure and to make variations and/or modifications within the ordinary skill of an artisan in this field, and to make substitution of different angles and shapes.

It is apparent that the revolvable teeth and the stationary teeth of the vessel, are positioned relative to one-another as to mesh and not strike during the cranking of the handle. The exact number of teeth is optional, as is the height of the vessel.

I claim:

1. A salad mixing device comprising in combination: an open-top vessel having a continuous circumscribing inner wall integral with a base therefor forming an enclosure with an open-top and having first rod-like elements extending from said inner wall inwardly into central space of the enclosure structure; the first rod-like elements being located at different elevations on the inner wall; and a lid fastenable onto and substantially sealable of the open-to-top, said continuous circumscribing inner wall having an inner surface carrying a male member, and a shaft mounted through the lid, said shaft carrying a cranking handle on an upper end thereof adapted to turn said shaft, said lid having a circumscribing downwardly-extending flange extending from an outer circumscribing edge of the lid, and said circumscribing downwardly-extending flange having a diameter between inner wall surfaces thereof adapted such that inner wall surfaces thereof fit wedgingly onto and around upper outer wall surfaces of said open-top vessel's said continuous circumscribing inner wall, and a lid slot being formed in said downwardly-extending flange of a size mateable with said male member when said lid is wedge-mounted onto the open-top vessel, such that said lid anchored against shifting rotatably on said open-top vessel when said cranking handle is cranked; and said shaft carrying fixedly-mounted outwardly-extending second rod-like elements on a lower portion of said shaft located beneath the lid, said second rod-like elements being located at elevations different from the elevations of the first rod-like elements and being movable laterally between said first rod-like elements to mesh with and move past said first rod-like elements when said cranking handle is cranked to turn said shaft when the lid is fastened onto said open-top vessel.

2. A salad mixing device of claim 1, in which said open-top vessel is substantially cylindrical in shape, defining a substantially cylindrical space therein.

3. A salad mixing device of claim 2, in which said second rod-like elements are substantially off-set from one-another such that adjacent ones are not over one-another whereby space is provided for movement of material being mixed by movement of the second rod-like elements.

4. A salad mixing device of claim 3, in which said first rod-like elements are substantially in the form of lineal shafts.

5. A salad mixing device of claim 4, in which said second rod-like elements are substantially in the form of lineal shafts.

6. A salad mixing device of claim 3, in which said second rod-like elements are substantially off-set from one-another such that adjacent ones are not one-over-the-other whereby space is provided for movement of materials being mixed by movement of the second rod-like elements.

7. A salad mixing device of claim 1, in which said first rod-like elements include as an integral part thereof a remaining other one of said male member and a female slot-member having an uprightly-extending slot, the male member being detachably matable within said uprightly-extending slot whereby said first rod-like elements extend from said inner surface when in a mounted state.

8. A salad mixing device of claim 1, including a laterally extending handle element integral with said lid adapted such that said lid may be held in a sturdy non-shifting state while said cranking handle is cranked.

* * * * *